(12) United States Patent
Akuta

(10) Patent No.: US 6,654,044 B2
(45) Date of Patent: Nov. 25, 2003

(54) SCANNING BEAM GENERATING UNIT EMPLOYED IN PRINTING APPARATUS

(75) Inventor: Tomokazu Akuta, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/747,973

(22) Filed: Dec. 27, 2000

(65) Prior Publication Data

US 2001/0007467 A1 Jul. 12, 2001

(30) Foreign Application Priority Data

Jan. 7, 2000 (JP) ........................................ 2000-001758

(51) Int. Cl.⁷ ................................................. B41J 27/00
(52) U.S. Cl. ........................................................ 347/260
(58) Field of Search ................................. 347/243, 259, 347/260, 225, 231, 261; 359/216, 196, 198

(56) References Cited

U.S. PATENT DOCUMENTS

| 4,545,669 A | * | 10/1985 | Hays et al. .................. 399/152 |
| 5,764,270 A | | 6/1998 | Kitagawa et al. ........... 347/234 |
| 5,877,884 A | * | 3/1999 | Yanagisawa ................. 359/198 |
| 6,195,190 B1 | * | 2/2001 | Tachibe et al. ............. 359/216 |

FOREIGN PATENT DOCUMENTS

| JP | 6-148553 | | 5/1994 |
| JP | 6-234234 | | 8/1994 |
| JP | 7-253553 | | 10/1995 |
| JP | 11-149239 | * | 6/1999 |
| JP | 11-281906 | | 10/1999 |

* cited by examiner

*Primary Examiner*—Michael Nghiem
(74) *Attorney, Agent, or Firm*—Armstrong, Westerman & Hattori, LLP

(57) ABSTRACT

Rotation of a polygon serves to generate a scanning laser beam in a scanning beam generating unit. The polygon is fixed on the drive shaft of a motor drive. The motor drive is located at a position spaced apart from a base frame. The base frame is designed to interrupt heat radiated toward the motor drive. As compared with the case where a motor drive is mounted directly upon a base frame, the motor drive is prevented from receiving heat through the base frame. It is possible to avoid an increase in the temperature of the motor drive to the utmost. In particular, rise in temperature can be prevented in the bearing supporting the drive shaft in the motor drive, so that a deterioration can be avoided in the bearing. At the same time, a deficiency in rotation, such as a jitter, can reliably be avoided in the motor drive.

15 Claims, 8 Drawing Sheets

SCANNING BEAM GENERATING UNIT EMPLOYED IN PRINTING APPARATUS

BACKGROUND OF THE INVENTION

1. Field of the Invention

The present invention relates in general to a scanning beam generating unit normally employed in a printing apparatus such as a laser printer, a laser facsimile, and the like. In particular, the invention relates to a scanning beam generating unit comprising: a base frame defining an emitting or output window; a motor drive supported on the base frame; a rotating mirror attached to the drive shaft of the motor drive and capable of reflecting a beam emitted from a light source; and an optical component mounted on the base frame and designed to direct the beam from the mirror to the output window.

2. Description of the Prior Art

A laser printer utilizes a laser beam irradiated on an optical photoconductor, namely, an optical photoconductive drum. The laser beam is designed to draw an electrostatic image on a photoconductive cylindrical surface of the drum. Particles of toner supplied to the drum serve to visualize the electrostatic image on the photoconductive cylindrical surface. The visible image of the toner can be transferred to the printing medium, such as a sheet of paper, from the photoconductive cylindrical surface of the drum. When the transferred toner is subjected to heat, the particles of the toner are fused so that the fused toner is deposited onto the printing medium. A fuser, such as a heat roller, may be employed to fuse and deposit the particles of the toner.

The laser beam is in general supplied from a scanning beam generating unit or optical unit. The rotating mirror having a shape, such as a polygon, causes the laser beam, emitted from a laser, to scan across the optical photoconductive drum along the meridian. Each facet of the polygon thus generates a scanning laser beam directed to the optical photoconductive drum. A motor drive is usually employed to generate rotation of the polygon.

In general, the fuser is preferably disposed adjacent or closer to the optical photoconductive drum in a laser printer. Such location of the fuser and drum enables a rapid fusion of the particles of the toner which have been transferred onto the printing medium. The toner can be fused soon after it has been transferred onto the printing medium. On the other hand, it is likewise preferable that the optical unit is disposed adjacent or closer to the optical photoconductive drum. Accordingly, the optical unit is usually disposed closer to the fuser. The smaller the size of the laser printer gets, the closer to the fuser the optical unit is disposed. However, if heat generated at the fuser is conducted to the optical unit, the motor drive tends to suffer from the deficiency of rotation, such as a jitter, because of an increased temperature in the bearing supporting the drive shaft, in particular. In addition, the bearing also suffers from a shortened lifetime or a deterioration.

SUMMARY OF THE INVENTION

It is accordingly an object of the present invention to provide a scanning beam generating unit, in general employed in a printing apparatus, capable of avoiding a deterioration and a jitter of a motor drive induced by thermal conduction.

According to the present invention, there is provided a scanning beam generating unit comprising: a base frame defining an output window; a motor drive disposed at a position spaced from the base frame and designed to rotate its drive shaft; a scanning mechanism attached to the drive shaft of the motor drive so as to allow a beam, emitted from a light source, to scan; and an optical component mounted on the base frame and designed to direct the beam from the scanning mechanism to the output window.

For example, the base frame serves to interrupt heat radiated toward the motor drive in the scanning beam generating unit. As compared with the case where a motor drive is mounted directly upon a base frame, the motor drive is prevented from receiving heat through the base frame. It is possible to avoid an increase in the temperature of the motor drive to the utmost. In particular, a rise in temperature can be prevented in the bearing supporting the drive shaft in the motor drive, so that a deterioration can be avoided in the bearing. At the same time, a deficiency in rotation, such as a jitter, can reliably be avoided in the motor drive.

The scanning beam generating unit may further comprise: an attachment member fixed on the base frame; and a basement member supported on the attachment member and spaced from the base frame so as to support the motor drive at a surface opposed to the base frame. The motor drive is located within a space defined between the base frame and the basement member. The basement member can be kept spaced enough from the base frame. Accordingly, heat is hardly conducted to the basement member from the base frame. Increases in temperature can still efficiently be avoided in the motor drive, in particular, at the bearing.

A heat radiation member may be attached on the basement member at a surface opposite to the surface on which the motor drive is attached. The radiation member serves to efficiently radiate heat staying at the basement member. Rises in temperature can still efficiently be avoided in the motor drive.

The scanning beam generating unit may further comprise: a thermal conductive frame cover coupled to the base frame so as to define a space for accommodating at least the optical component; and a conductive member connecting the frame cover to the basement member. The thermal conductive frame cover and the conductive member serve to increase the radiation area for heat staying at the basement member. Such an increase in the radiation area contributes to an accelerated heat radiation from the basement member.

In general, a printing apparatus employing the aforementioned scanning beam generating unit includes a heat source represented by a fuser such as a heat roller, for example. The scanning beam generating unit is often disposed adjacent or closer to the heat source. If the base frame is designed to oppose its back surface to the heat source, while the base frame receives the attachment member at the front surface, it is possible to avoid an increase in temperature of the motor drive spaced apart from the base frame. Accordingly, a deterioration can be avoided in the bearing supporting the drive shaft in the motor drive. At the same time, a deficiency in rotation, such as a jitter, can reliably be avoided in the motor drive.

In addition, the scanning beam generating unit is often located above an optical photoconductor such as an optical photoconductive drum within a housing or enclosure of the printing apparatus. If the output window is defined in the base frame, the base frame is allowed to keep facing the front surface upward when the scanning beam generating unit is assembled within the housing of the printing apparatus. The base frame can be received on a stationary support or stay within the housing of the printing apparatus. In this case, the scanning beam generating unit may simply be mounted from the above onto the upper surface of the stationary support, so that an operator is allowed to assemble the scanning beam generating unit within the housing of the printing apparatus in a facilitated manner.

A conductive connecting member may be employed to connect the basement member to the conductive stationary support. The connecting member and the stationary support contribute to an increased radiation area for heat staying at the basement member. Such an increase in the radiation area enables an accelerated heat radiation from the basement member.

Furthermore, a heat insulator may be attached to the base frame at a location between the motor drive and the fuser. The heat insulator serves to still efficiently interrupt or block heat radiated from the fuser. Less heat energy reaches the motor drive. In this way, an increase in the temperature can still efficiently be avoided in the motor drive.

Furthermore, the aforementioned printing apparatus may further comprise a ventilator designed to generate an air stream directed at least toward the motor drive. The generated air stream can be utilized to drive heat in the vicinity of the motor drive away, so that an increase in the temperature can still efficiently be avoided in the motor drive.

It should be noted that the printed apparatus may be represented by a laser printer, a laser facsimile, and the like. Any types of beam may be employed, instead of a laser beam, to electrically charge the optical photoconductor in the printer and facsimile.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
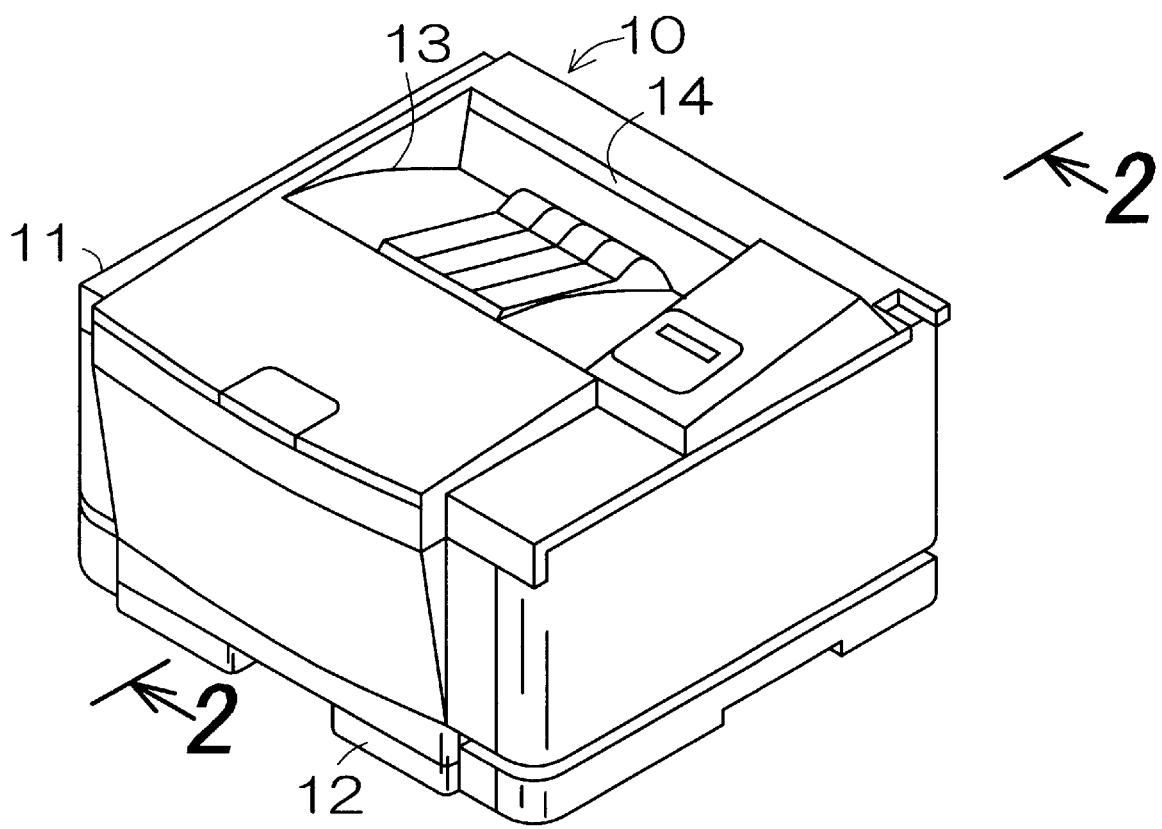
FIG. 1 is a perspective view illustrating a laser printer.

FIG. 1 schematically illustrates the structure of a laser printer 10 as an example of a printing apparatus. The laser printer 10 includes a paper cassette 12 assembled within a printer housing 11, and a paper tray 13 integrally defined on the top or upper surface of the printer housing 11. A printing medium such as sheets of paper is stacked within the paper cassette 12, for example. The imaged sheet of paper after printing is discharged from an outlet 14 onto the paper tray 13. The laser printer 10 may be connected to a computer, not shown, for printing operation, for example.

Figure 2:
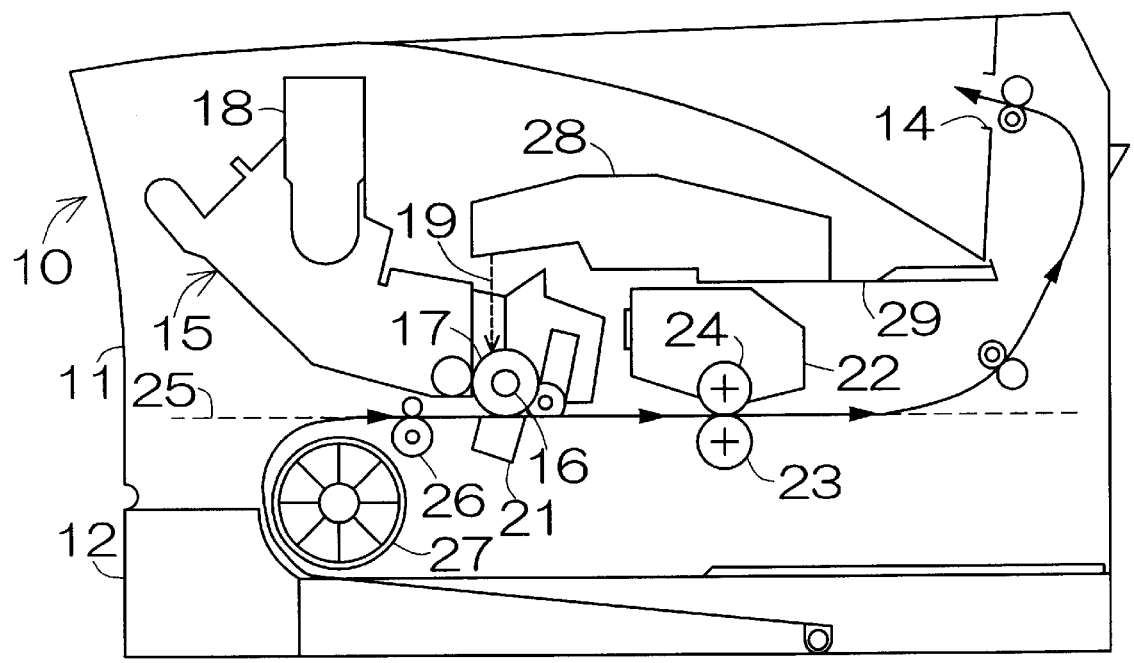
FIG. 2 is an enlarged sectional view taken along the line 2—2 in FIG. 1 for schematically illustrating the interior structure of the laser printer.

As shown in FIG. 2, a printing unit or print drum kit 15 is accommodated in the printer housing 11. The printing drum kit 15 includes, as conventionally known, an imaging or optical photoconductive drum 17 rotatable around a rotative rod 16 extending in the lateral direction of the sheet of paper, and a toner cartridge 18 designed to store particles of toner which are to be supplied to the optical photoconductive drum 17. The cylindrical surface of the optical photoconductive drum 17 can be electrically charged with a laser beam 19, as described later in detail. The toner is then supplied to the optical photoconductive drum 17 from the toner cartridge 18 after exposure by the laser beam 19. An electrostatic image drawn by the laser beam 19 is accordingly visualized by the toner. The visible image of the toner is established on the cylindrical surface of the optical photoconductive drum 17. In general, the printing unit 15 is detachably mounted or set at a predetermined position within the printer housing 11.

A transfer unit 21 includes a transfer roller, not shown, opposed to the optical photoconductive drum 17, for example. The transfer roller may be made of a cylindrical rubber. The transfer roller serves to urge a sheet of paper against the optical photoconductive drum 17. The visible image of the toner on the optical photoconductive drum 17 is transferred onto the sheet of paper between the optical photoconductive drum 17 and the transfer roller. The transfer roller may be designed to rotate around the longitudinal axis parallel to the rotative rod 16 of the optical photoconductive drum 17.

A fusing unit 22 includes a fuser or heat roller 24 designed to urge a sheet of paper against a backup roller 23. The heat from the heat roller 24 serves to fuse the particles of the toner sticking to a sheet of paper. The visible image of the toner is thus deposited on the sheet of paper. The heat roller 24 may likewise be designed to rotate around the longitudinal axis parallel to the rotative rod 16 of the optical photoconductive drum 17.

As is apparent from FIG. 2, the heat roller 24 is located at a position adjacent or closer to the optical photoconductive drum 17 on a horizontal plane 25. Accordingly, a sheet of paper is kept at a horizontal attitude when it passes through a path from a position between the optical photoconductive drum 17 and the transfer roller to a position between the heat roller 24 and the backup roller 23. In this case, a feeding roller 26 made of a cylindrical rubber, for example, is employed to establish the horizontal attitude of the sheet of paper prior to supply of the sheet of paper to the position between the optical photoconductive drum 17 and the transfer roller. The feeding roller 26 may likewise be designed to rotate around the longitudinal axis parallel to the rotative rod 16 of the photoconductive drum 17, for example.

A pickup roller 27 is designed to feed a sheet of paper to the feeding roller 26, for example. The pickup roller 27 may likewise be designed to rotate around the longitudinal axis parallel to the rotative rod 16 of the optical photoconductive drum 17. The pickup roller 27 is designed to receive the top sheet of the papers stacked within the paper cassette 12, for example. A sheet on the top of the stack is urged against the rubber surface of the pickup roller 27. When the pickup roller 27 rotates, sheets of paper may sequentially be taken out of the paper cassette 12 one by one.

A scanning beam generating unit or optical unit 28 is disposed in a space between the top surface or wall of the printer housing 11 and the printing unit 15 as well as the fusing unit 22. The optical unit 28 is designed to generate and output the laser beam 19 toward the aforementioned optical photoconductive drum 17. The optical unit 28 is supported or fixed on a stationary support or stay 29 of a higher rigidity. The stationary stay 29 may be made from a polycarbonate material.

Figure 3:
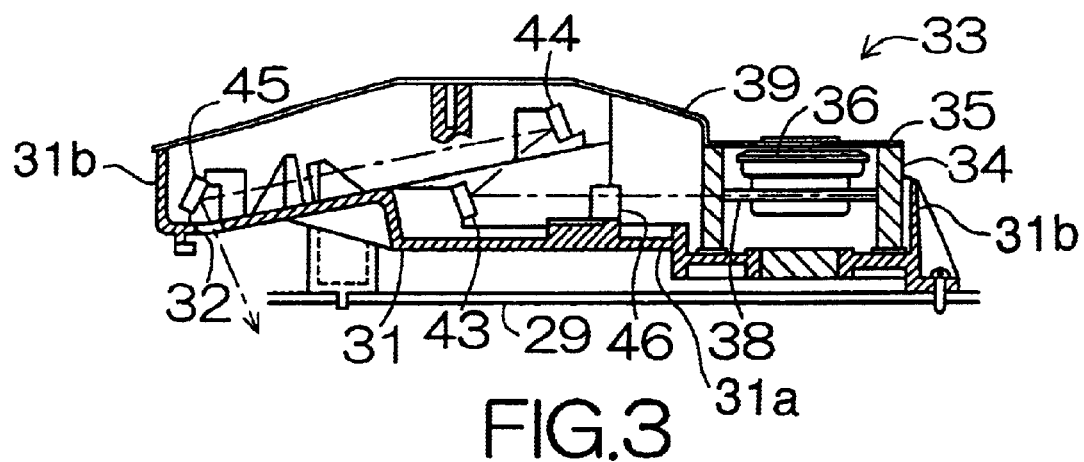
FIG. 3 is a sectional view schematically illustrating the structure of an optical unit.

Here, the optical unit 28 comprises a base frame 31 having a bottom 31a and upstanding peripheral sides 31b fixed to the stationary stay 29, as shown in FIG. 3, for example. The base frame 31 may be made from a synthetic resin. The back or lower surface of the base frame bottom 31a is oppositely spaced from the fusing unit 22, namely, the heat roller 24. The stationary stay 29 extends through a space defined between the back surface of the base frame 31 and the fusing unit 22. An output window 32 is defined in the base frame 31. The output window 32 is designed to extend in the direction parallel to the rotative rod 16 of the optical photoconductive drum 17. A transparent glass plate may be fitted in the output window 32, for example.

A scanner motor assembly 33 is mounted on the front or upper surface of the base frame 31. The scanner motor assembly 33 includes a suspension support member, termed the "basement member", 35 made of a metallic or steel plate. The basement member 35 is supported on the top of an attachment member 34 standing from the upper surface of the base frame 31. A motor drive 36 is attached to the basement member 35 at the surface opposed to and spaced from the base frame 31. The motor drive 36 comprises a drive shaft 36a supported by a bearing, not shown, for rotation. Any types of bearing, such as a ball bearing, a fluid bearing, an air bearing, can be employed as the bearing.

Figure 4:
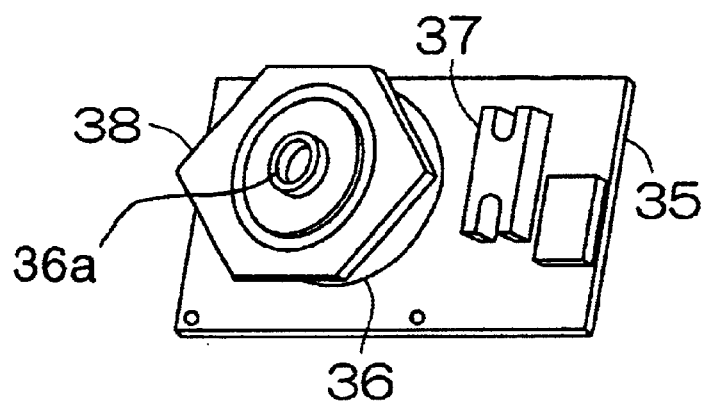
FIG. 4 is an enlarged perspective view illustrating the structure of a scanner motor assembly.

In addition, a controller 37 is mounted on the basement member 35 for controlling the operation of the motor drive 36, as shown in FIG. 4. A rotating mirror or polygonal mirror 38 is attached to the tip end of the drive shaft 36a of the motor drive 36. The polygonal mirror 38 comprises facets arranged along the sides of a regular polygon, such as the hexagon, for example. The polygonal mirror 38 functions as a scanning mechanism of the present invention.

Referring again to FIG. 3, when the basement member 35 is fixed above the base frame 31, the motor drive 36 is accommodated within a space defined between the base frame 31 and the basement member 35. The space may totally be surrounded by the attachment member 34, for example. The motor drive 36 is disposed at a position spaced from the base frame 31. The motor drive 36 is prevented from directly contacting the base frame 31. When a frame cover 39 is coupled to the base frame 31, the frame cover 39 serves to define a space continuous to the space for the motor drive 36 between the base frame 31 and the frame cover 39 itself. In this case, it is preferable that the continuous spaces are air-tightly closed. The frame cover 39 may be formed out of a metallic material of a higher capability in heat radiation, such as a steel or an aluminum plate. The frame cover 39 can be formed with a press.

Figure 5:
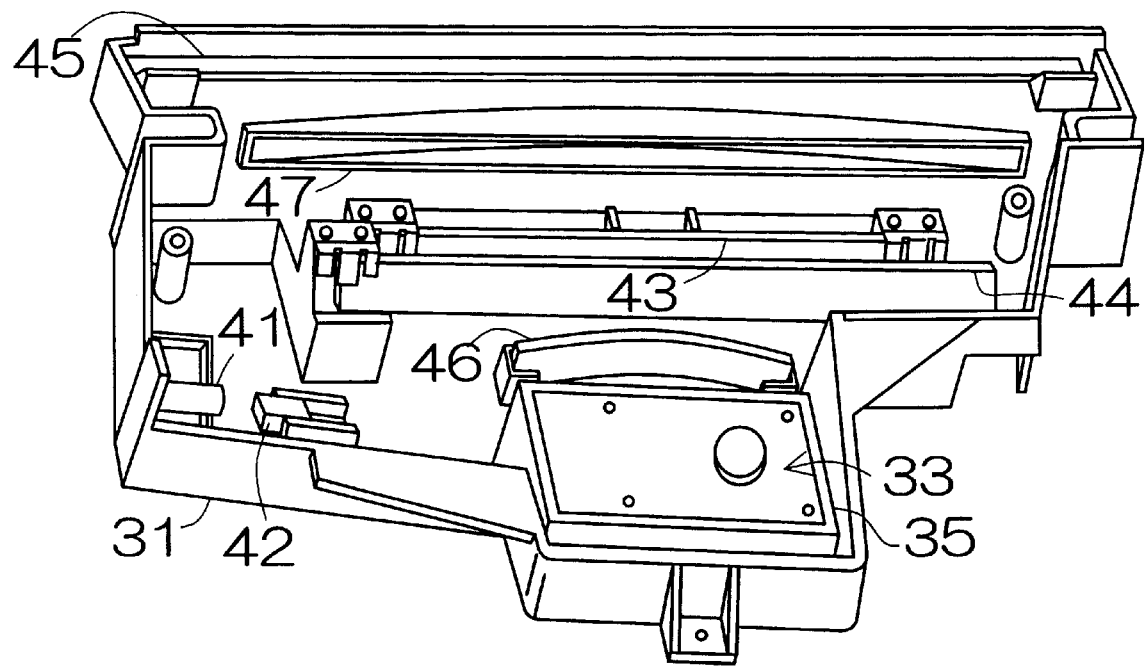
FIG. 5 is a perspective view of a base frame, with the scanner motor assembly mounted thereon, for schematically illustrating the positional relationship between a laser diode (LD) collimator assembly and optical components.

Referring also to FIG. 5, a laser diode (LD) collimator assembly 41 including a laser diode as a light source is attached on the upper surface of the base frame 31. The LD collimator assembly 41 also includes a collimating lens designed to collimate the laser beam emitted from the laser diode. After collimation, the laser beam is directed to the scanner motor assembly 33.

A cylindrical lens 42 is disposed at a location between the LD collimator assembly 41 and the scanner motor assembly 33. The cylindrical lens 42 may be fixed on the upper surface of the base frame 31. The cylindrical lens 42 is designed to modify the spot of the laser beam into the circular shape. The scanner motor assembly 33 generates a scanning laser beam based on the laser beam supplied from the cylindrical lens 42. The generated scanning laser beam is then directed to the output window 32.

Various optical components are disposed between the scanner motor assembly 33 and the output window 32. The optical components can be represented by three reflecting mirrors 43, 44, 45 as well as two fθ lenses 46, 47. The mirrors 43–45 and the lenses 46, 47 are accommodated within a closed space defined between the base frame 31 and the frame cover 39. The optical components 43–47 serve to direct the scanning laser beam to the output window 32. The mirrors 43–45 and the lenses 46, 47 can be positioned and fixed on the upper surface of the base frame 31 at a higher accuracy.

Figure 6:
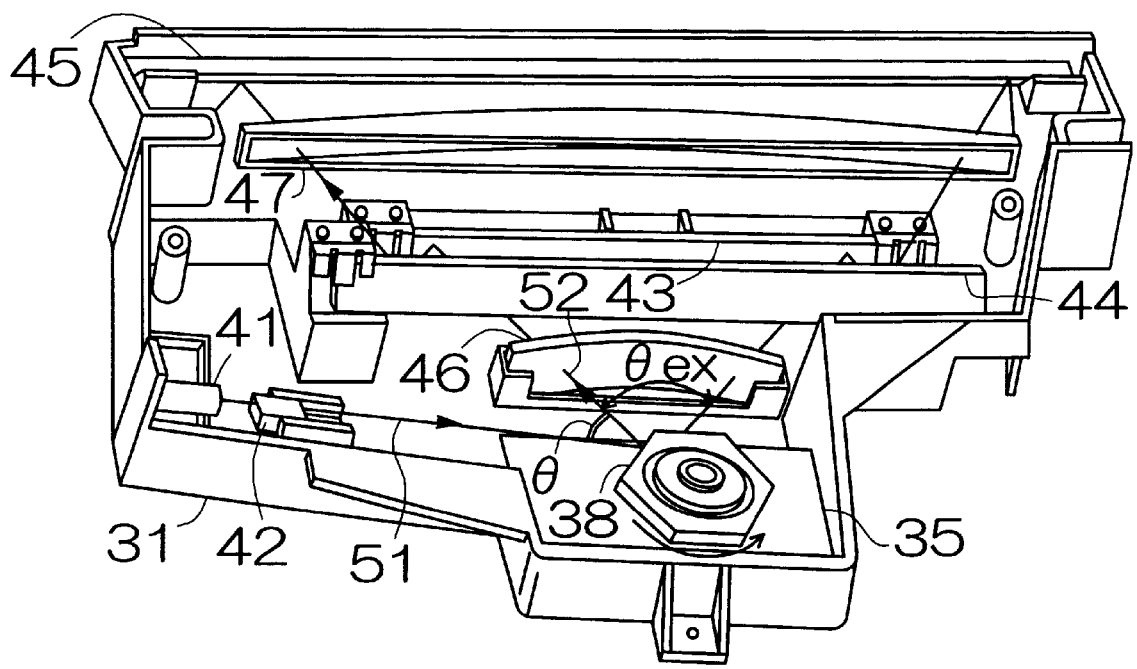
FIG. 6 is a perspective view of the base frame, with the basement member detached, for illustrating the optical path for the laser beam.

Now, assume that a laser beam is emitted from the LD collimator assembly 41 in response to instructions from a computer, as shown in FIG. 6, for example. The irradiation of the laser beam is turned on/off at the laser diode of the LD collimator assembly 41 in accordance with the information of a page or an image contained in the instructions. The laser beam passes through the cylindrical lens 42 so as to reach the polygonal mirror 38.

The polygonal mirror 38 is designed to rotate with the drive shaft 36a of the motor drive 36 at a predetermined constant velocity. The rotation of the polygonal mirror 38 causes the direction of its facet to change with respect to the incident optical path 51 of the laser beam. The change in the direction of the facet induces variation in the relative angle θ defined between the incident optical path 51 and the reflecting optical path 52. The variation in the relative angle θ generates a scanning laser beam. The swing extent or angle $\theta_{ex}$ of the scanning laser beam can be determined in accordance with the size or extent of the facet. Each facet of the polygonal mirror 38 generates a scanning laser beam.

The reflecting mirrors 43–45 serve to direct the generated scanning laser beam to the output window 32. The scanning laser beam passes through the fθ lenses 46, 47 between the polygonal mirror 38 and the output window 32. The fθ lenses 46, 47 serve to allow the spot of the scanning laser beam to move across the surface of the optical photoconductive drum 17 in the axial or longitudinal direction at a constant velocity. Moreover, the scanning laser beam reaches the output window 32 after reflection at the opposed reflecting mirrors 43, 44, as is apparent from FIG. 3. A longer optical path can be established for the scanning laser beam, as compared with the case where the laser beam is directly led to the reflecting mirror 45 without refection at the opposed reflecting mirrors 43, 44. Such a longer optical path enables reduction in the swinging extent or angle $\theta_{ex}$ of the scanning laser beam while keeping a longer scan line on the surface of the optical photoconductive drum 17 along the meridian.

During the printing operation employing the scanning laser beam output from the optical unit 28 in the above-described manner, a larger heat energy is generated at the fusing unit 22, namely, the heat roller 24. As is apparent from FIG. 2, the heat of the fusing unit 22 is radiated toward the optical unit 28 right above the fusing unit 22. On the other hand, the motor drive 36 is kept spaced apart from the base frame 31, directly opposed to the fusing unit 22, as is apparent from FIG. 3. The heat is hardly transmitted to the motor drive 36 through the base frame 31. An increase in temperature can be avoided in the motor drive 36 to the utmost. In particular, a rise in temperature can be prevented in the bearing supporting the drive shaft in the motor drive 36, so that a deterioration can be avoided in the bearing. At the same time, a deficiency in rotation, such as a jitter, can reliably be avoided in the motor drive 36.

Moreover, the motor drive 36 is located within a space defined between the base frame 31 and the basement member 35 in the aforementioned manner. Accordingly, the basement member 35 can be kept spaced enough from the base frame 31, 50 that heat is hardly conducted to the basement member 35 from the base frame 31. Increases in temperature can still efficiently be avoided in the motor drive 36.

Figure 7:
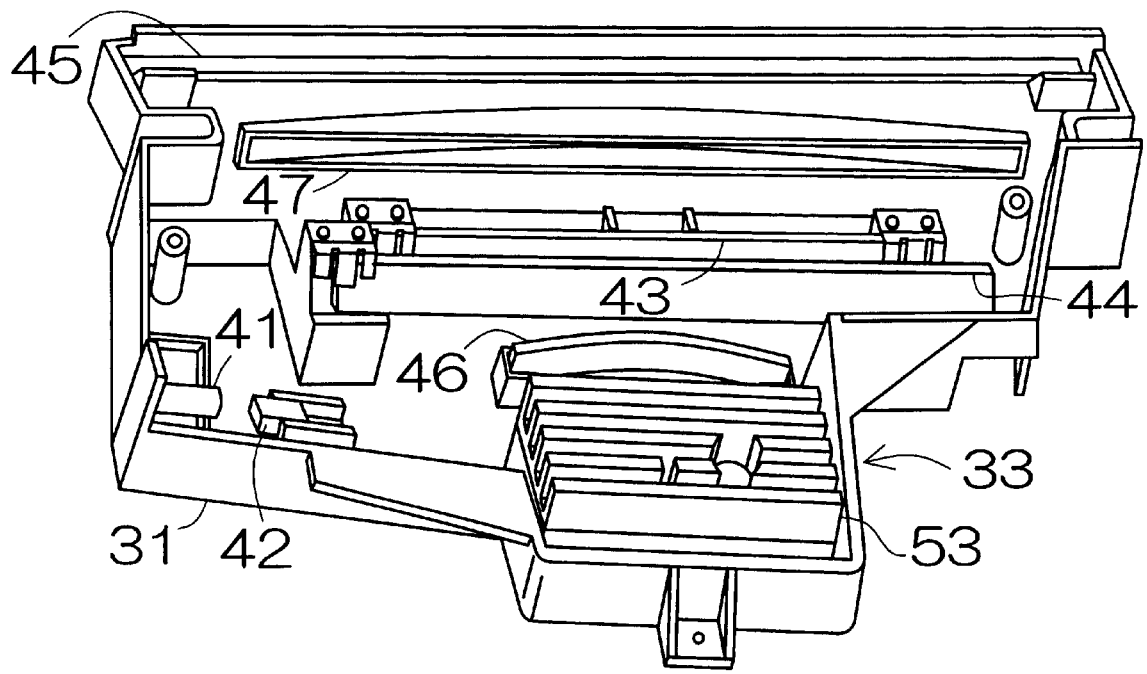
FIG. 7 is a perspective view of the base frame for illustrating a radiation fin attached to the scanner motor assembly.

The aforementioned optical unit 28 my further comprise a heat radiation member such as a radiation fin 53 attached to the back or upper surface of the basement member 35, as shown in FIG. 7, for example. Heat staying within the space for the motor drive 36 can be transmitted to the radiation fin 53 through the basement member 35. The radiation fin 53 serves to efficiently radiate heat staying in the space for the motor drive 36. Rises in temperature can still efficiently be avoided in the motor drive 36.

Figure 8:
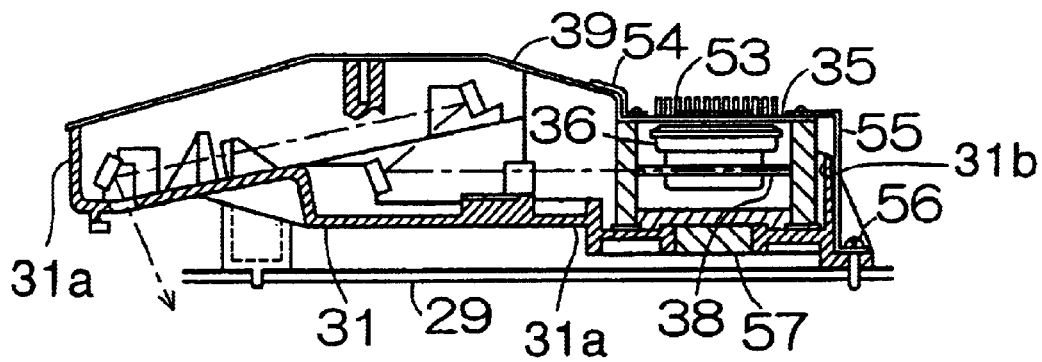
FIG. 8 is a sectional view schematically illustrating the structure of a modified example of an optical unit.

In addition, the aforementioned basement member 35 may be connected to the frame cover 39 with a conductive member such as a leaf spring 54, as shown in FIG. 8, for example. The leaf spring 54 may be made from a metallic material of a higher thermal conductivity, such as a steel plate, an aluminum plate, and the like. The leaf spring 54 serves to transmit heat of the basement member 35 to the frame cover 39. Such an increase in the radiation area contributes an accelerated heat radiation from the basement member 35.

As is also apparent from FIG. 8, the basement member 35 may be connected to the stationary stay 29 through a connecting member such as a conductive leaf spring 55, for example. The leaf spring 55 may likewise be made from a metallic material of a higher thermal conductivity, such as a steel plate, an aluminum plate, and the like. The leaf spring 55 contributes to an accelerated conduction of heat from the basement member 35 to the stationary stay 29 in cooperation with a conductive or metallic screw 56. The heat radiation from the basement member 35 can thus be promoted.

Furthermore, a heat insulator 57 may be disposed between the motor drive 36 and the heat roller 24, opposed to the motor drive 36 at a distance, for avoiding an increase in the temperature of the motor drive 36. The heat insulator 57 can be disposed within an opening defined in the base frame 31, or be adhered to the back or lower surface of the base frame 31.

Figure 9:
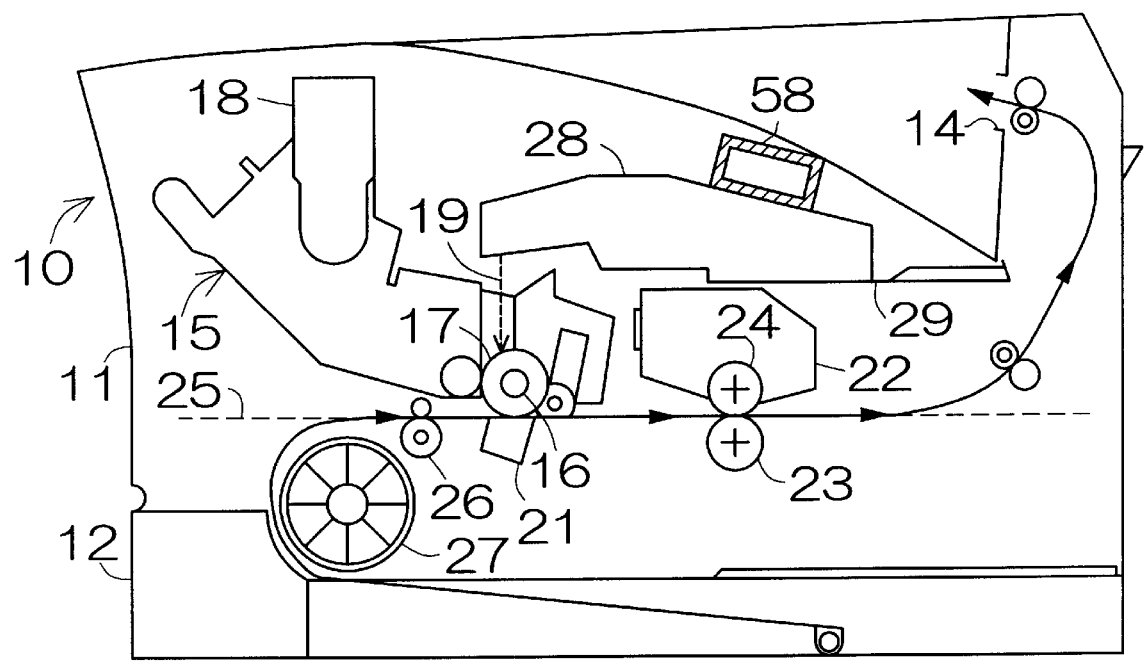
FIG. 9 is an enlarged sectional view of another example of a laser printer for schematically illustrating an air stream duct within the printer housing.
Figure 10:
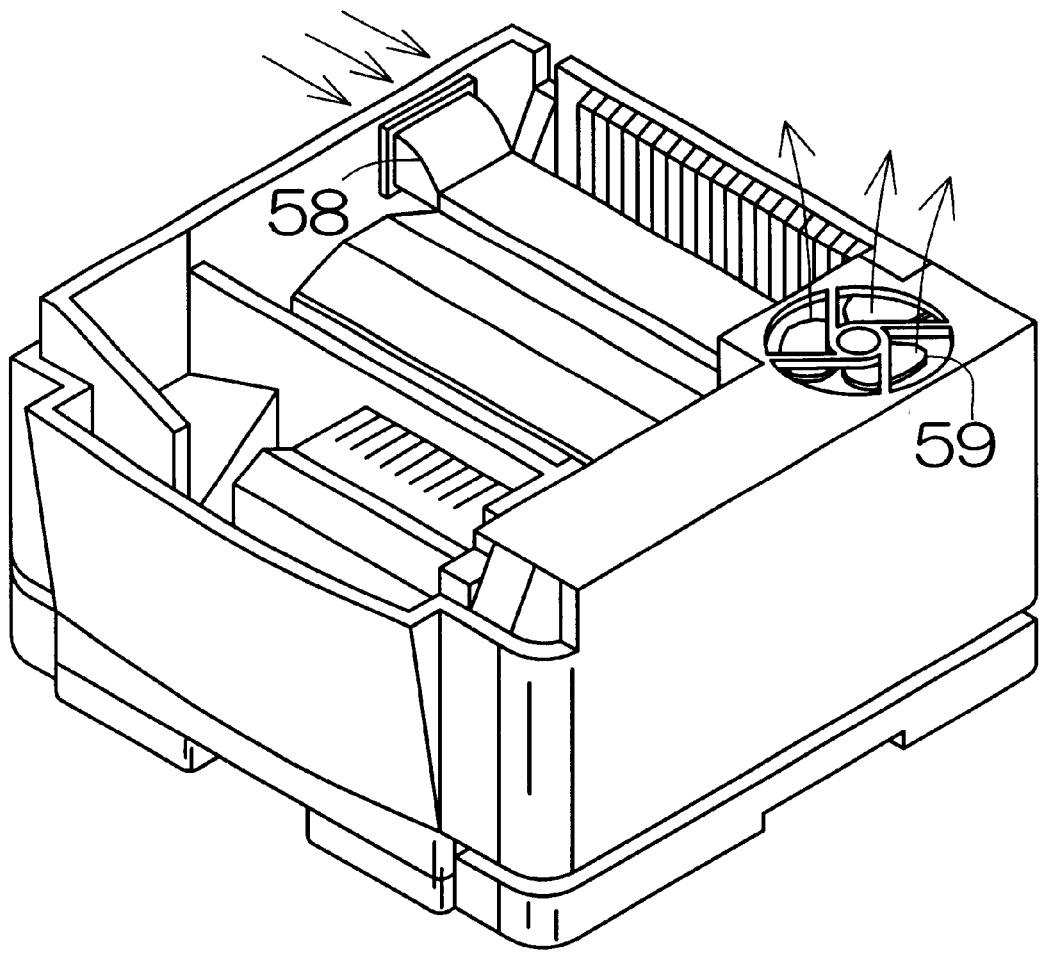
FIG. 10 is a perspective view of the laser printer for schematically illustrating the inner structure within the printer housing.

In place of the radiation fin 53, the laser printer 10 may comprise an air stream duct 58 contacting the back surface of the basement member 35 within the printer housing 11, as shown in FIG. 9, for example. As shown in FIG. 10, a ventilator such as a ventilation fan 59 may be connected to the air stream duct 58. The ventilation fan 59 is designed to generate an air stream passing through the air stream duct 58 right behind the basement member 35 and the motor drive 36. The air stream serves to absorb heat staying at the basement member 35. Increase in temperature can thus efficiently be avoided in the basement member 35 and the motor drive 36.

It should be noted that the aforementioned optical unit 28 can be employed in combination with any optical photoconductor other than the aforementioned optical photoconductive drum 17. Any number and/or size of the facets can be defined on the polygonal mirror 38. The optical unit 28 may include any optical components, any number or combination of reflecting mirrors and fθ lenses, for example. Furthermore, the optical unit 28 may employ any beam other than the aforementioned laser beam.

What is claimed is:

1. A scanning beam generating unit comprising:
    a base frame defining an output window operative to bottom support the scanning beam generating unit with respect to a fixed base, said base frame and including a bottom having an inner surface;
    an attachment member extending from the inner surface of said bottom and mounting a basement member defining a support having an inner surface opposed to and spaced from said inner surface of the base frame bottom thereby providing a space between the inner surface of the basement member and the inner surface of the base frame bottom;
    a motor drive having a drive shaft and being suspendedly disposed in the space between the inner surface of the basement member and the invention surface of the base frame bottom;
    a scanning mechanism attached to the drive shaft of the motor drive so as to cause a beam, emitted from a light source, to scan; and
    an optical component mounted on the bottom of the base frame and being operative to direct the beam from the scanning mechanism to the output window.

2. The scanning beam generating unit according to claim 1, wherein:
    the attachment member is fixed on the base frame; and
    the basement member is fixedly mounted on the attachment member.

3. The scanning beam generating unit according to claim 2, further comprising a heat radiation member attached to a surface of the basement member opposite that from which the motor drive is supported.

4. The scanning beam generating unit according to claim 1, wherein said base frame further comprises a surrounding side wall connected to a periphery of the bottom, and
    the scanning beam generating unit further comprising:
        a thermal conductive frame cover to the surrounding side wall of the base frame so as to cover a top of the base frame and define a space for accommodating at least the optical component and
        a heat conductive member connecting the frame cover to the basement member.

5. The scanning beam generating unit according to claim 1, wherein an insulating airspace is defined between the motor drive and the bottom of the base frame.

6. The scanning beam generating unit according to claim 5, wherein an insulating airspace is defined between the scanning mechanism and the bottom of the base frame.

7. A printing apparatus comprising:
    a base frame having an output window and including a bottom having an inner surface and an outer surface, and a surrounding side wall defining an open top, said outer surface of said bottom being disposed in facing relation to a fuser;
    an attachment member extending from an inner surface of the bottom of the base frame;

a basement member defining a support mounted on the attachment member and having an inner surface opposed to the inner surface of the bottom of the base frame providing a space therebetween;

a motor drive having a drive shaft and being suspendedly disposed in the space between the inner surface of the bottom of the base frame and the inner surface of the support basement member;

a rotating mirror attached to the drive shaft of the motor drive so as to cause a beam, emitted from a light source, to scan;

an optical component mounted on the bottom of the base frame and being operative to direct the beam from the rotating mirror to the output window; and a frame cover coupled to the surrounding wall of the base frame so as to cover the top of the base frame and define a space between the base frame and the frame cover itself.

8. The printing apparatus according to claim 7, further comprising a heat radiation member attached on a back surface of the support, a front surface of the support receiving the motor drive.

9. The printing apparatus according to claim 7,
wherein said frame cover being thermally conductive and coupled to the base frame so as to define a space for accommodating at least the optical component; and the printing apparatus further comprises a conductive member connecting the frame cover to the basement member.

10. The printing apparatus according to claim 9, further comprising:

a conductive stationary support designed to receive the base frame; and a conductive connecting member designed to connect the basement member to the stationary support.

11. The printing apparatus according to claim 7, further comprising a heat insulator attached to the base frame and located between the motor drive and the fuser.

12. The printing apparatus according to claim 7, further comprising a ventilator designed to generate an air stream directed at least toward the motor drive.

13. The printing apparatus according to claim 7, wherein an insulating airspace is defined between the motor drive and the bottom of the base frame.

14. The printing apparatus according to claim 13, wherein an insulating airspace is defined between the rotating mirror and the bottom of the base frame.

15. A printing apparatus comprising:

a base frame having an output window and a back surface disposed in facing relation to a fuser;

an attachment member extending from a strong surface of the base frame;

a motor drive supported on the attachment member and located above the base frame;

a rotating mirror attached to a drive shaft of the motor drive so as to cause a beam, emitted from a light source to scan;

an optical mirror attached to a drive shaft of the motor drive so as to cause a beam, emitted from a light source, to scan;

an optical component mounted on the base frame and being operative to direct the beam from the rotating mirror to the output window;

a frame cover coupled to the base frame so as to define a space between the base frame and frame cover itself; and a heat insulator attached to the base frame and located between the motor drive and the fuser.

* * * * *